US012498618B2

(12) United States Patent
Go et al.

(10) Patent No.: US 12,498,618 B2
(45) Date of Patent: Dec. 16, 2025

(54) CAMERA ACTUATOR (71) Applicant: JAHWA ELECTRONICS CO., LTD., Cheongju-si (KR)

(72) Inventors: Jae Yong Go, Chungju-si (KR); Seok Hyun Kim, Daejeon (KR); Jin Tae Kim, Cheongju-si (KR); Hong Seong Kim, Gwangmyeong-si (KR)

(73) Assignee: JAHWA ELECTRONICS CO., LTD., Cheongju-si (KR)

( * ) Notice: Subject to any disclaimer, the term of this patent is extended or adjusted under 35 U.S.C. 154(b) by 429 days.

(21) Appl. No.: 18/002,022

(22) PCT Filed: Sep. 24, 2021

(86) PCT No.: PCT/KR2021/013041
§ 371 (c)(1),
(2) Date: Dec. 15, 2022

(87) PCT Pub. No.: WO2022/071691
PCT Pub. Date: Apr. 7, 2022

(65) Prior Publication Data
US 2023/0251550 A1    Aug. 10, 2023

(30) Foreign Application Priority Data
Sep. 29, 2020    (KR) .................. 10-2020-0126615

(51) Int. Cl.
*G03B 5/00*    (2021.01)
*G03B 13/36*    (2021.01)
(Continued)

(52) U.S. Cl.
CPC ............... *G03B 5/00* (2013.01); *G03B 13/36* (2013.01); *G03B 17/12* (2013.01); *H04N 23/55* (2023.01);
(Continued)

(58) Field of Classification Search
CPC .......... G03B 5/00; G03B 13/36; G03B 17/12; G03B 2205/0007; H04N 23/55; H04N 23/687
See application file for complete search history.

(56) References Cited
U.S. PATENT DOCUMENTS

2013/0142502 A1*    6/2013    Kang .................. G02B 27/646
396/55
2018/0095239 A1    4/2018    Lee et al.
(Continued)

FOREIGN PATENT DOCUMENTS

JP    2016-24318 A    2/2016
JP    2018-136563 A    8/2018
(Continued)

OTHER PUBLICATIONS

International Search Report for PCT/KR2021/013041 by Korean Intellectual Property Office dated Jan. 12, 2022.

*Primary Examiner* — Jia X Pan
(74) *Attorney, Agent, or Firm* — BROADVIEW IP LAW, PC (57) ABSTRACT A camera actuator is provided. The camera actuator according to an embodiment of the present invention comprises: a housing; and AF carrier which is mounted in the housing and moves in an optical-axis direction; an OIS carrier which is mounted in the AF carrier and moves in a direction perpendicular to the optical-axis direction; a first ball member which is disposed between the inner surface of the housing and the outer surface of the AF carrier to assist in the movement of the AF carrier; a second ball member which is disposed between the AF carrier and the OIS carrier to assist in the movement of the OIS carrier; and an OIS damper which is disposed between the inner surface of the AF carrier
(Continued)

and the outer surface of the OIS carrier so as to reduce the impact generated between the AF carrier and the OIS carrier.

5 Claims, 8 Drawing Sheets

(51) Int. Cl.
    *G03B 17/12*     (2021.01)
    *H04N 23/55*     (2023.01)
    *H04N 23/68*     (2023.01)
(52) U.S. Cl.
    CPC ... *H04N 23/687* (2023.01); *G03B 2205/0007* (2013.01)

(56) References Cited

U.S. PATENT DOCUMENTS

| | | | |
|---|---|---|---|
| 2022/0163089 A1* | 5/2022 | Kim | G03B 5/00 |
| 2023/0012973 A1* | 1/2023 | Lim | H04N 23/687 |

FOREIGN PATENT DOCUMENTS

| | | | | |
|---|---|---|---|---|
| KR | 10-1300341 B1 | | 8/2013 | |
| KR | 10-2015-0138034 A | | 12/2015 | |
| KR | 10-1579586 B1 | | 12/2015 | |
| KR | 20150138034 A | * | 12/2015 | |
| KR | 10-2017-0051975 A | | 5/2017 | |
| KR | 10-2020-0092924 A | | 8/2020 | |
| WO | WO-2021010652 A1 | * | 1/2021 | F16F 15/04 |

\* cited by examiner

CAMERA ACTUATOR

CROSS-REFERENCE TO RELATED APPLICATIONS

This application is a National Phase Entry Application of PCT Application No. PCT/KR2021/013041 filed on Sep. 24, 2021, which claims priority to Korean Patent Application No. 10-2020-0126615 filed on Sep. 29, 2020, in Korean Intellectual Property Office, the entire contents of which are hereby incorporated by reference in its entirety.

TECHNICAL FIELD

The present invention relates to a camera actuator.

BACKGROUND ART

In recent years, portable electronic devices are equipped with cameras in common. Accordingly, functions that support infants and the elderly, as well as adults who are not familiar with camera shooting, are being applied to effectively use the camera to take pictures. Representative support functions include Auto Focus (AF) and Optical Image Stabilization (OIS).

These functions include a mechanical mechanism for moving the camera lens in the optical axis direction or in a direction perpendicular to the optical axis direction. This mechanical mechanism is damaged by collision between internal components due to external impact or causes inconvenience to the user due to a collision sound.

To prevent this, technologies for mitigating the impact are being developed. However, these are technologies for mitigating the impact between the housing, which is mostly an external case, and the carrier closest to the housing, and there is no technology for shock mitigation inside the carrier. In particular, in the case of a camera module in which the AF function and the OIS function are integrated into a module, the amount of impact generated inside the carrier increases due to the increase in the weight of the lens, and consequently the damage to the parts is large, so it is urgent to prepare countermeasures for this.

PRIOR ART DOCUMENT

Patent Document (Patent Document 001) JP 2018-136563 A

DETAILED DESCRIPTION OF THE INVENTION

Problems to be Solved by the Invention

In order to solve the problems of the related art as described above, an embodiment of the present invention is to provide a camera actuator capable of alleviating the shock generated inside the camera module.

The technical problems to be solved in the present invention are not limited to the technical problems mentioned above, and other technical problems not mentioned will be clearly understood by those of ordinary skill in the art from the following description.

Means for Solving the Problem

According to one aspect of the present invention for solving the above problems, there is provided a camera actuator comprising: a housing comprising a base and a cover; an AF carrier mounted in the housing and moving in the optical axis direction; an OIS carrier on which a lens barrel is mounted, and mounted in the AF carrier to move in a direction perpendicular to the optical axis direction; a first ball member disposed between the inner side surface of the housing and the outer side surface of the AF carrier to assist movement of the AF carrier; a second ball member disposed between the AF carrier and the OIS carrier to assist movement of the OIS carrier; and an OIS damper disposed between an inner side surface of the AF carrier and an outer side surface of the OIS carrier to mitigate an impact occurring between the AF carrier and the OIS carrier.

In an embodiment, the OIS damper may be disposed on a side surface of the first ball member of the inner side surface of the AF carrier.

In an embodiment, the AF carrier may have a groove part on the inner side surface, and the OIS damper may be inserted into the groove part.

In an embodiment, the OIS damper may be inserted to protrude from the groove part toward the OIS carrier.

In an embodiment, the OIS damper may be disposed on an upper portion of the inner surface of the AF carrier.

In an embodiment, the OIS damper may be disposed on opposite sides of the AF carrier corresponding to the first ball member.

In an embodiment, the camera actuator may further include a stopper disposed above the OIS carrier to restrict the movement of the OIS carrier in the optical axis direction, and the OIS damper may be provided integrally with the bottom surface of the stopper.

In an embodiment, the camera actuator may further include an AF damper disposed between the AF carrier and the base of the housing and between the AF carrier and the cover of the housing to mitigate an impact occurring between the AF carrier and the housing.

Effects of the Invention

The camera actuator according to an embodiment of the present invention can mitigate an impact in the direction perpendicular to the optical axis direction inside the carrier by adding an OIS damper between the AF carrier and the OIS carrier, thereby suppressing lens damage due to an internal impact of the OIS carrier on which the lens barrel is mounted.

In addition, the present invention can suppress denting of the AF guide rail by a collision of the AF ball member with the AF guide rail due to an impact by mitigating the impact in the direction perpendicular to the optical axis direction toward the AF ball member.

In addition, the present invention can effectively block transmission of an impact in a direction perpendicular to the optical axis direction to the AF carrier by having the OIS damper on the AF ball member, thereby further suppressing lens damage due to an internal impact of the carrier and denting of the AF ball guide rail.

DETAILED DESCRIPTION FOR CARRYING OUT THE INVENTION

Hereinafter, exemplary embodiments of the present invention will be described in detail so that those of ordinary skill in the art can readily implement the present invention with reference to the accompanying drawings. The present invention may be embodied in many different forms and is not limited to the embodiments set forth herein. In the drawings, parts unrelated to the description are omitted for clarity of description of the present invention. Throughout the specification, like reference numerals denote like elements.

Embodiments of the present invention are provided to describe the present invention more fully to those skilled in the art, the embodiments described below can be modified into various other forms, and the scope of the present invention is not limited to the following embodiments. Rather, these embodiments make the present invention more meaningful and complete and are provided for fully conveying the concept of the present invention to those of ordinary skill in the art.

Hereinafter, the embodiments of the present invention are described with reference to the drawings schematically illustrating the embodiments of the present invention. In the drawings, for example, variations in the illustrated shape may be expected depending on manufacturing techniques and/or tolerances. Accordingly, the embodiments of the present invention should not be construed as being limited to any particular shape of the regions illustrated herein and should include, for example, variations in shape resulting from manufacturing.

Figure 1:
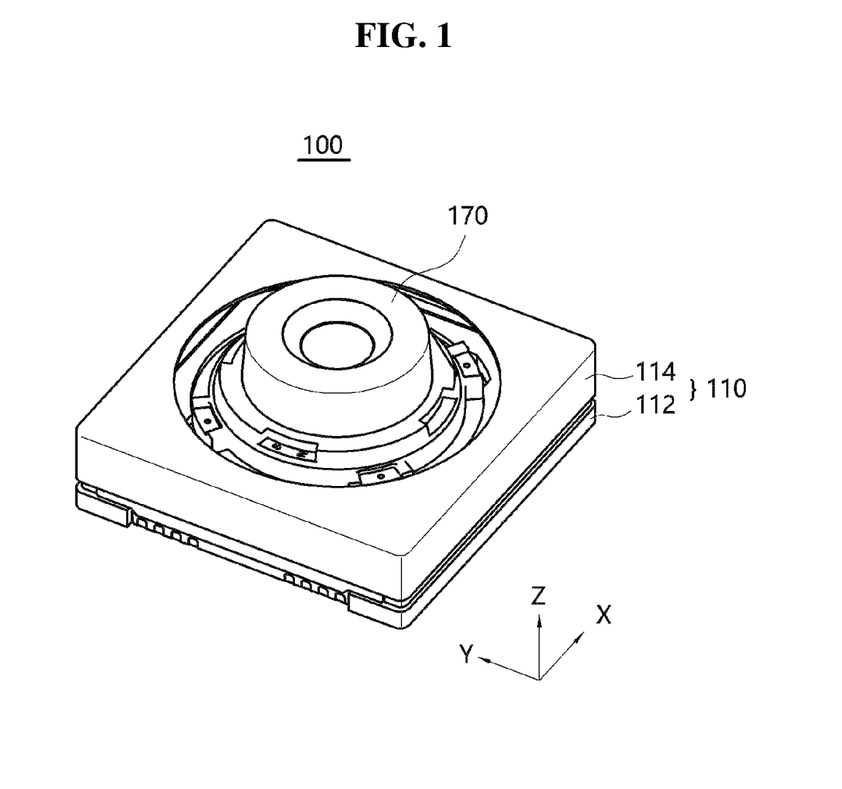
FIG. 1 is a perspective view of a camera actuator according to an exemplary embodiment of the present invention.
Figure 2:
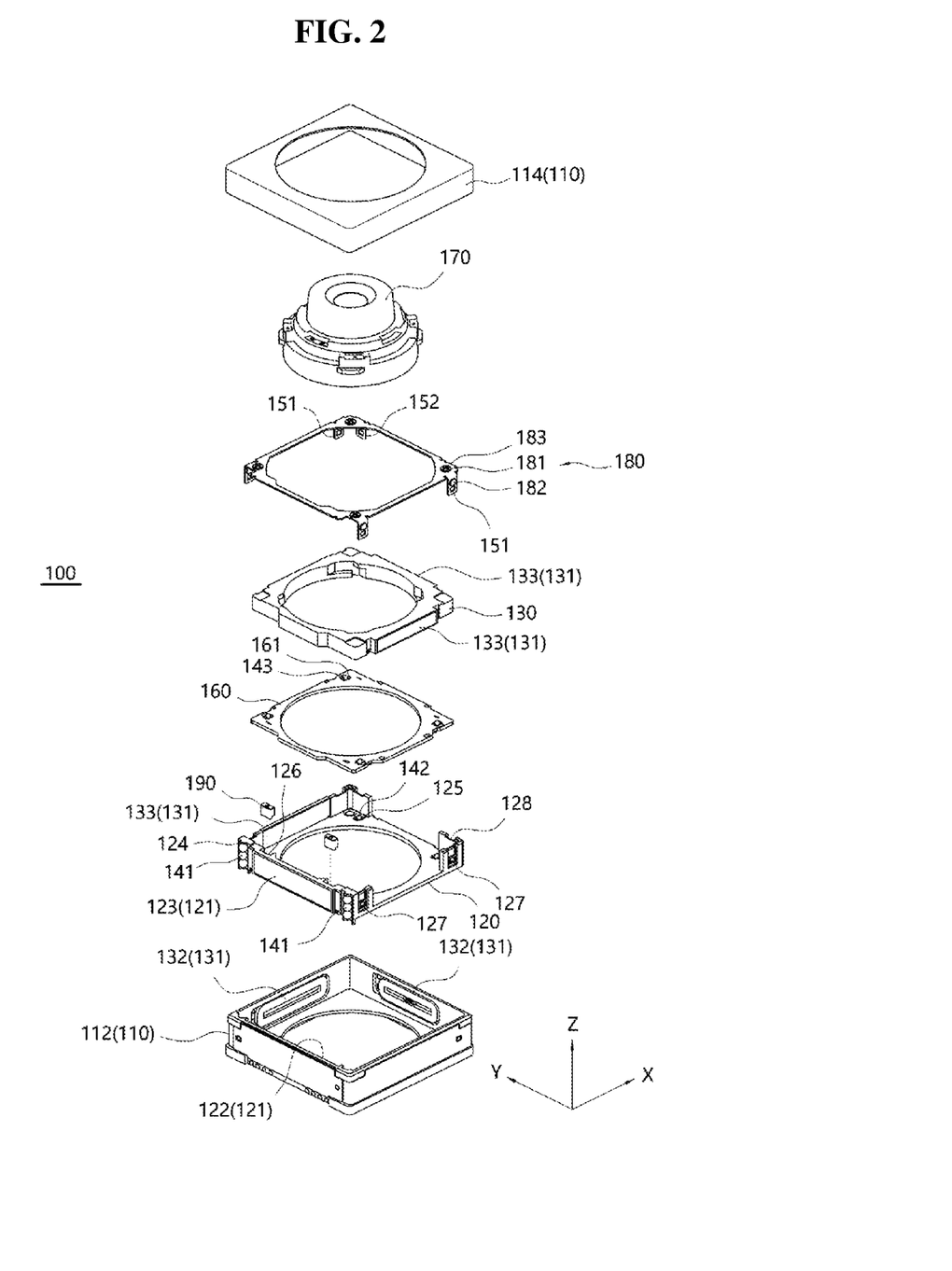
FIG. 2 is an exploded perspective view of a camera actuator according to an exemplary embodiment of the present invention.

FIG. 1 is a perspective view of a camera actuator according to an exemplary embodiment of the present invention, and FIG. 2 is an exploded perspective view of a camera actuator according to an exemplary embodiment of the present invention.

Referring to FIG. 1 and FIG. 2, the actuator 100 for a camera according to an embodiment of the present invention may include a housing 110, an AF carrier 120, an OIS carrier 130, a ball member 140, a stopper 150, a middle guide 160, a lens barrel 170, an AF damper 180, and an OIS damper 190.

The actuator 100 for a camera is an actuator for application to a camera module mounted on a portable electronic device and is provided with an AF function and an OIS function of the camera module integrally. Here, the portable electronic device includes, but is not particularly limited to, a smartphone, a notebook computer, a personal computer, a PDA, a notebook computer, and a tablet PC.

The housing 110 is an external case of the actuator 100 for a camera and may include a base 112 and a cover 114.

The base 112 may have a rectangular frame shape having a space in which other components are mounted. Here, an AF magnet 123 of an AF driving unit 121 or an OIS magnet 133 of an OIS driving unit 131 may be disposed on all four side surfaces of the base 112.

The cover 114 may be disposed to cover the upper side of the base 112. In this case, the cover 114 may be disposed to cover the upper and side surfaces of the base 112. In addition, the cover 114 may be provided with a circular opening on the top surface thereof so that the lens barrel 170 is exposed to the outside.

The AF carrier 120 may be mounted in the housing 110 to move in the optical axis direction. Here, the optical axis direction refers to the lens direction of the lens barrel 170. In FIG. 2, the optical axis direction represents the Z-axis direction. That is, the AF carrier 120 may move in the Z-axis direction.

At this time, the AF carrier 120 may move in the optical axis direction (Z-axis direction) together with the OIS carrier 130 on which the lens barrel 170 is mounted. Accordingly, the actuator 100 for a camera may provide an AF function.

To this end, the actuator 100 for a camera may include an AF driving unit 121 and a first guide rail 124.

The AF driving unit 121 may provide an electromagnetic force for the AF carrier 120 to move in the optical axis direction (Z-axis direction). The AF driving unit 121 may include an AF coil 122 and an AF magnet 123.

The AF coil 122 may be disposed on one side surface of the base 112. For example, the AF coil 122 may be disposed on the inner side surface of the front side of the base 112 in the first direction perpendicular to the optical axis direction. In FIG. 2, the first direction perpendicular to the optical axis direction represents the X-axis direction.

The AF magnet 123 may be disposed on one side surface of the AF carrier 120 to face the AF coil 122. For example, the AF magnet 123 may be provided on the outer side surface of the front side of the AF carrier 120 in the first direction (X-axis direction) perpendicular to the optical axis direction.

The first guide rail 124 is for guiding a first ball member 141 and may be an AF ball guide rail. The first guide rail 124 may be provided on opposite sides of the AF magnet 123 in the AF carrier 120. For example, the first guide rail 124 may be provided in the optical axis direction (Z-axis direction) on opposite sides of the outer side surface of the AF carrier 120 on which the AF magnet 123 is disposed. Here, the first guide rail 124 may be a groove into which the first ball member 141 is inserted.

With this configuration, when a current is applied to the AF coil 122, an electromagnetic force is generated between the AF coil 122 and the AF magnet 123. By the electromagnetic force generated in this way, the AF carrier 120 may be supplied with a driving force for movement in the optical axis direction (Z-axis direction). In this case, the AF carrier 120 may move in the optical axis direction (Z-axis direction) by the rolling behavior of the first ball member 141 inserted into the first guide rail 124. Accordingly, the actuator 100 for a camera can automatically adjust the focal length of the lens.

The OIS carrier 130 may be mounted in the AF carrier 120 to move in a direction perpendicular to the optical axis direction. Here, the direction perpendicular to the optical axis direction refers to the left and right directions of the lens barrel 170. In FIG. 2, a first direction perpendicular to the optical axis direction indicates an X-axis direction, and a second direction perpendicular to the optical axis direction indicates a Y-axis direction. That is, the OIS carrier 130 may move in the X-axis direction or the Y-axis direction. Accordingly, the actuator 100 for a camera may provide an OIS function.

To this end, the actuator 100 for a camera may include an OIS driving unit 131 and a second guide rail 125.

The OIS driving unit 131 may provide an electromagnetic force for the OIS carrier 130 to move in the first direction (X-axis direction) or the second direction (Y-axis direction) perpendicular to the optical axis direction. The OIS driving unit 131 may include an OIS coil 132 and an OIS magnet 133.

The OIS coil 132 may be disposed on three side surfaces of the base 112. For example, the OIS coil 132 may be disposed on three inner side surfaces of the base 112 except for the inner side surface on which the AF coil 122 is disposed. That is, the OIS coil 132 may be disposed in a "⊏" shape on the inner side surface of the base 112.

The OIS magnet 133 may be disposed on three side surfaces of the OIS carrier 130 to face the OIS coil 132. For example, the OIS magnet 133 may be disposed on three outer side surfaces of the OIS carrier 130 except for the outer side surface corresponding to the AF magnet 123. In FIG. 2, one OIS magnet 133 is shown to be disposed on the AF carrier 120, but this is only according to the coupling structure of the AF carrier 120 and the OIS carrier 130, and when the OIS carrier 130 is mounted in the AF carrier 120, it is obvious that the OIS magnets 133 are all disposed on the outer side surfaces of the OIS carrier 130.

The second guide rail 125 is for guiding a second ball member 142 and may be an OIS ball guide rail. The second guide rail 125 may be provided near each corner on the bottom surface of the AF carrier 120 facing the OIS carrier 130. For example, the second guide rail 125 may be provided in the first direction (X-axis direction) perpendicular to the optical axis direction near the corners corresponding to opposite sides of the OIS magnet 133 on the bottom surface of the AF carrier 120. Here, the second guide rail 125 may be a groove into which the second ball member 142 is inserted.

With this configuration, when a current is applied to the OIS coil 132, an electromagnetic force is generated between the OIS coil 132 and the OIS magnet 133. By the electromagnetic force generated in this way, the OIS carrier 130 may be supplied with a driving force for movement in a direction perpendicular to the optical axis direction (X-axis direction or Y-axis direction). In this case, the OIS carrier 130 may move in the first direction (X-axis direction) perpendicular to the optical axis direction by the rolling behavior of the second ball member 142 inserted into the second guide rail 125. In addition, the OIS carrier 130 may move in the second direction (Y-axis direction) perpendicular to the optical axis direction by the rolling behavior of a third ball member 143 inserted into a third guide rail 161 as will be described later. Accordingly, the actuator 100 for a camera may correct the hand-shake state by correcting the balance state in the horizontal direction with respect to the optical axis direction (Z-axis direction).

The ball member 140 may assist the movement of the AF carrier 120 and the OIS carrier 130. The ball member 140 may include a first ball member 141, a second ball member 142, and a third ball member 143.

The first ball member 141 may be disposed between the inner side surface of the housing 110 and the outer side surface of the AF carrier 120. Here, the first ball member 141 may be inserted into the first guide rail 124 of the AF carrier 120. In addition, the first ball member 141 may be inserted into a groove part (not shown) provided at a position corresponding to the first guide rail 124 in the base 112. Accordingly, the first ball member 141 may perform a rolling behavior in the optical axis direction (Z-axis direction) within the first guide rail 124. Therefore, the first ball member 141 may assist the movement of the AF carrier 120 in the optical axis direction (Z-axis direction).

The second ball member 142 may be disposed between the AF carrier 120 and the OIS carrier 130. For example, the second ball member 142 may be disposed between the top surface of the AF carrier 120 and the bottom surface of the middle guide 160. Here, the second ball member 142 may be inserted into the second guide rail 125 of the AF carrier 120. In addition, the second ball member 142 may be inserted into a groove part (not shown) provided at a position corresponding to the second guide rail 125 on the bottom surface of the middle guide 160. Accordingly, the second ball member 142 may perform a rolling behavior in the first direction (X-axis direction) perpendicular to the optical axis direction within the second guide rail 125. Therefore, the second ball member 142 may assist the movement of the OIS carrier 130 in the first direction (X-axis direction) perpendicular to the optical axis direction.

The third ball member 143 may be disposed between the top surface of middle guide 160 and the bottom surface of the OIS carrier 130. Here, the third ball member 143 may be inserted into the third guide rail 161 of the middle guide 160. In addition, the third ball member 143 may be inserted into a groove part (not shown) provided at a position corresponding to the third guide rail 161 on the bottom surface of the OIS carrier 130. Accordingly, the third ball member 143 may perform a rolling behavior in the second direction (Y-axis direction) perpendicular to the optical axis direction within the third guide rail 161. Therefore, the third ball member 143 may assist the movement of the OIS carrier 130 in the second direction (Y-axis direction) perpendicular to the optical axis direction.

The stopper 150 may be disposed above the OIS carrier 130. In this case, the OIS carrier 130 may be coupled to the AF carrier 120. Accordingly, the stopper 150 may restrict the movement of the OIS carrier 130 in the optical axis direction (Z-axis direction) within the AF carrier 120.

In addition, the stopper 150 may include a first extension part 151 and a second extension part 152 for coupling with the AF carrier 120. Here, the first extension part 151 and the second extension part 152 may be integrally formed vertically downward from the top surface of the stopper 150.

The first extension part 151 may be provided in a second direction (Y-axis direction) perpendicular to the optical axis direction near each corner of the stopper 150. For example, the first extension part 151 may be provided at each corner and a total of four may be provided.

The second extension part 152 may be provided toward a first direction (X-axis direction) perpendicular to the optical axis direction from one side of the stopper 150. For example, two second extension parts 152 may be provided on the rear side of the first direction (X-axis direction) perpendicular to the optical axis direction.

The middle guide 160 may be disposed between the AF carrier 120 and the OIS carrier 130 to assist the movement of the OIS carrier 130 in a direction perpendicular to the optical axis direction (X-axis direction or Y-axis direction). For example, the bottom surface of the middle guide 160 may be in point contact with the second ball member 142 inserted into the second guide rail 125 provided on the bottom surface of the AF carrier 120. In this case, the middle guide 160 may move in the first direction (X-axis direction) perpendicular to the optical axis direction by the rolling behavior of the second ball member 142. By the movement of the middle guide 160 as described above, the OIS carrier 130 coupled to the middle guide 160 may move in the first direction (X-axis direction) perpendicular to the optical axis direction.

In addition, the middle guide 160 may include a third guide rail 161 on its top surface. The third guide rail 161 is for guiding a third ball member 143 and may be an OIS ball guide rail. The third guide rail 161 may be provided at each corner portion of the top surface of the middle guide 160 facing the OIS carrier 130. For example, the third guide rail 161 may be provided in the second direction (Y-axis direction) perpendicular to the optical axis direction near the corners corresponding to opposite sides of the OIS magnet 133 on the top surface of the middle guide 160. Here, the third guide rail 161 may be a groove into which the third ball member 143 is inserted.

Accordingly, the middle guide 160 may assist the movement of the OIS carrier 130 in the second direction (Y-axis direction) perpendicular to the optical axis direction. Therefore, the OIS carrier 130 may move in the second direction (Y-axis direction) perpendicular to the optical axis direction by the rolling behavior of the third ball member 143 inserted into the third guide rail 161.

The lens barrel 170 may be coupled to the OIS carrier 130 and mounted on the base 112 through the AF carrier 120. The lens barrel 170 may include one or more lenses for capturing an image.

The AF damper 180 may mitigate an impact occurring between the AF carrier 120 and the housing 110. Here, the AF damper 180 may be disposed between the AF carrier 120 and the base 112 of the housing 110. In addition, the AF damper 180 may be disposed between the AF carrier 120 and the cover 114 of the housing 110. For example, the AF damper 180 may be provided in the stopper 150. Here, the AF damper 180 may include a first AF damper 181, a second AF damper 182, and a third AF damper 183.

The first AF damper 181 may be provided on the top surface of the stopper 150. That is, the AF damper 180 may be disposed between the bottom surface of the cover 114 and the top surface of the stopper 150. Accordingly, the first AF damper 181 may mitigate an impact in the optical axis direction (Z-axis direction) between the cover 114 and the AF carrier 120.

The second AF damper 182 may be provided on the outer side surface of the first extension part 151 of the stopper 150. That is, the second AF damper 182 may be disposed between the outer side surface of the AF carrier 120 and the inner side surface of the base 112 in the second direction (Y-axis direction) perpendicular to the optical axis direction. Accordingly, the second AF damper 182 may mitigate an impact in the second direction (Y-axis direction) perpendicular to the optical axis direction between the base 112 and the AF carrier 120.

The third AF damper 183 may be provided on the outer side surface of the second extension part 152 of the stopper 150. That is, the third AF damper 183 may be disposed between the outer side surface of the AF carrier 120 and the inner side surface of the base 112 in the first direction (X-axis direction) perpendicular to the optical axis direction. Accordingly, the third AF damper 183 can mitigate an impact in the first direction (X-axis direction) perpendicular to the optical axis direction between the base 112 and the AF carrier 120.

In this case, the AF carrier 120 may be provided with a second groove part 127 and a third groove part 128 corresponding to the first extension part 151 and the second extension part 152 on the outer side surface near each corner. Here, the second groove part 127 may be provided at a position corresponding to the first extension part 151. Here, the third groove part 128 may be provided at a position corresponding to the second extension part 152. Accordingly, the second AF damper 182 may be disposed in the second groove part 127, and the third AF damper 183 may be disposed in the third groove part 128 (see FIG. 8).

Meanwhile, the actuator 100 for a camera has a structure in which the OIS carrier 130 is mounted in the AF carrier 120. In this case, the OIS carrier 130 has a degree of freedom in a direction (X-axis direction or Y-axis direction) perpendicular to the optical axis direction inside the AF carrier 120. Therefore, even if the impact or noise of the AF carrier 120 is removed by the AF damper 180, the impact to the OIS carrier 130 should be alleviated because the OIS carrier 130 is driven inside the AF carrier 120.

That is, the impact occurring from the outside based on the AF carrier 120 can be mitigated by the AF damper 180, but the impact occurring inside the AF carrier 120 by the OIS carrier 130 or the lens barrel 170 mounted on the OIS carrier 130 is not mitigated by the AF damper 180. This may cause damage such as impact sound caused by impact between carriers in the AF carrier 120 or denting of the AF guide rail due to collision.

To solve this, the actuator 100 for a camera according to an embodiment of the present invention may include an OIS damper 190.

The OIS damper 190 may mitigate the impact of the OIS carrier 130 mounted in the AF carrier 120. Here, the OIS damper 190 may be disposed between the inner side surface of the AF carrier 120 and the outer side surface of the OIS carrier 130. For example, the OIS damper 190 may be inserted into the first groove part 126 provided in the AF carrier 120.

In this case, the AF carrier 120 may be provided with a first groove part 126 inside the side surface where the AF magnet 123 is provided. For example, the first groove part 126 may be provided on opposite sides of the side surface where the AF magnet 123 is provided.

Accordingly, the OIS damper 190 may mitigate the impact between the AF carrier 120 and the OIS carrier 130 in a direction perpendicular to the optical axis direction. Therefore, the actuator 100 for a camera according to an embodiment of the present invention can suppress lens damage due to an internal impact of the OIS carrier 130 on which the lens barrel 170 is mounted. In particular, the actuator 100 for a camera can suppress the lens damage that occurs frequently due to the internal impact of the OIS carrier 130 due to an increase in the weight of the lens.

Furthermore, the actuator 100 for a camera according to an embodiment of the present invention can suppress denting of the first guide rail 124 by a collision of the first ball member 141 with the first guide rail due to an impact by mitigating the impact in the direction perpendicular to the optical axis direction toward the first ball member 141, which is an AF ball member.

Figure 3:
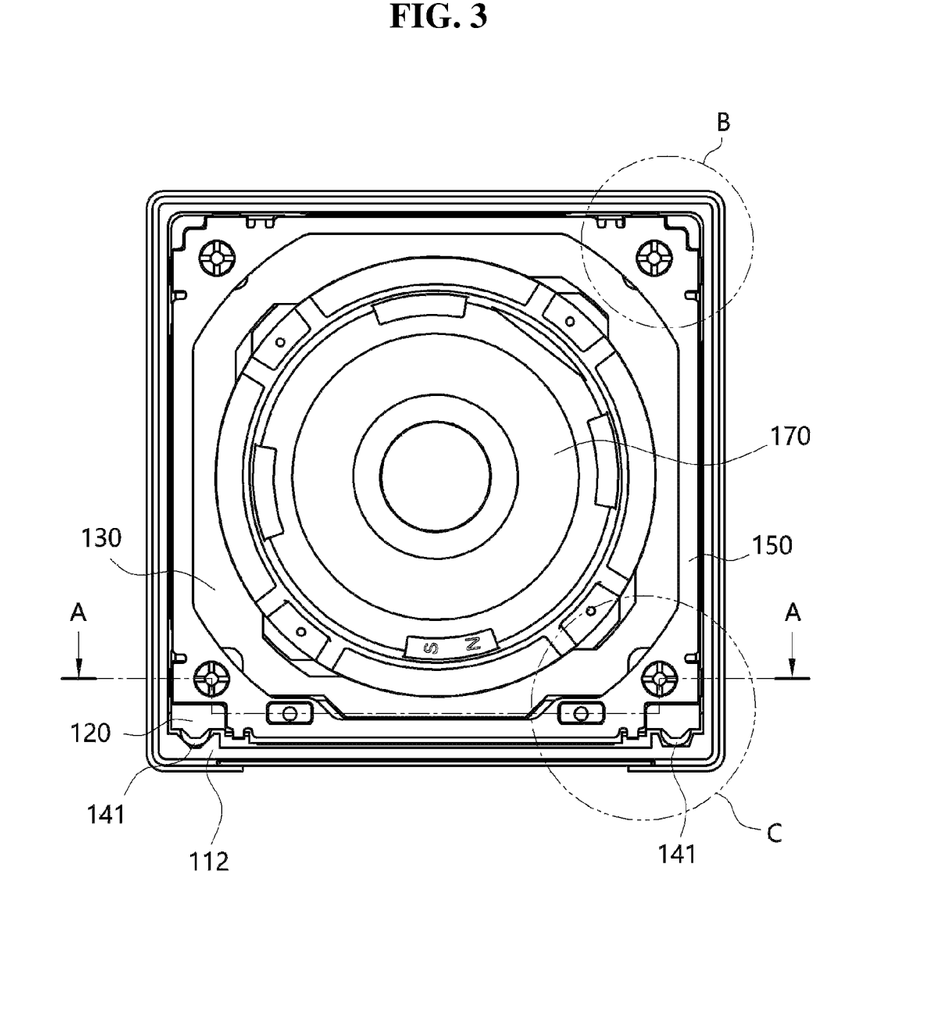
FIG. 3 is a plan view of a camera actuator according to an exemplary embodiment of the present invention.
Figure 4:
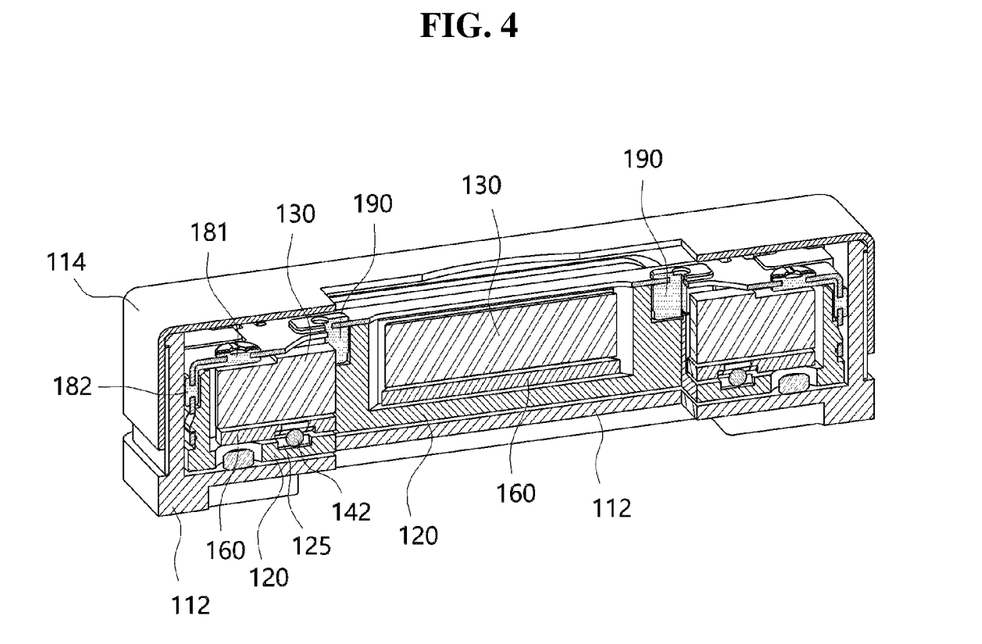
FIG. 4 is a perspective view of a state taken along the line A-A of FIG. 3.
Figure 5:
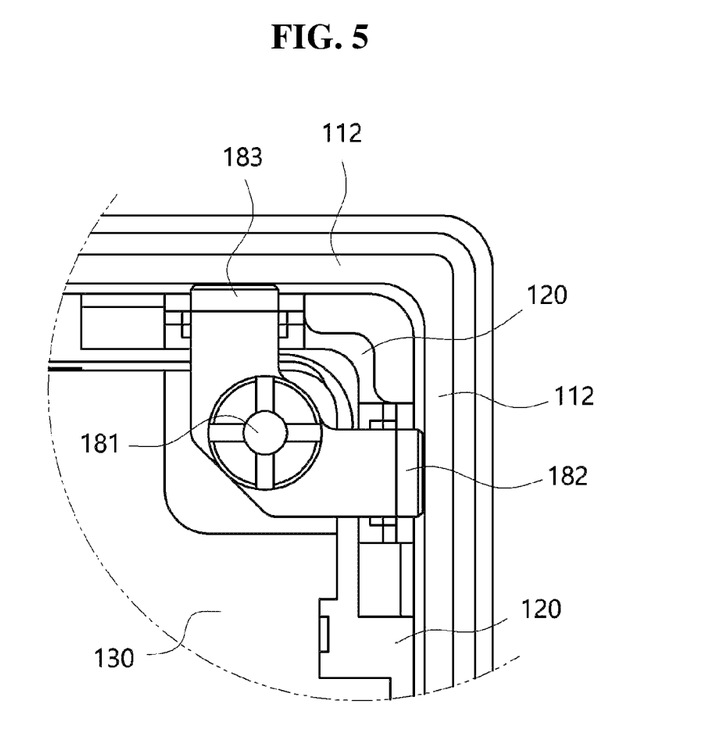
FIG. 5 is an enlarged view of a state in which a stopper is removed from a portion B of FIG. 3.

FIG. 3 is a plan view of a camera actuator according to an exemplary embodiment of the present invention, FIG. 4 is a perspective view of a state taken along the line A-A of FIG. 3, and FIG. 5 is an enlarged view of a state in which a stopper is removed from a portion B of FIG. 3.

Referring to FIG. 3, the OIS damper 190 may be provided on a side surface of the first ball member 141 of the inner side surface of the AF carrier 120. In this case, the AF carrier 120 may have a first groove part 126 on the inner side surface of the side surface on which the first ball member 141 is disposed. In addition, the OIS damper 190 may be inserted into the first groove part 126 of the AF carrier 120.

Accordingly, the actuator 100 for a camera according to an embodiment of the present invention can effectively block transmission of an impact due to the collision between the AF carrier 120 and the OIS carrier 130 to the AF carrier 120 in a direction perpendicular to the optical axis direction (X-axis direction). Therefore, the actuator 100 for a camera can further suppress damage to the lens due to the internal impact of the carrier. In particular, the actuator 100 for the camera can further suppress the denting of the AF ball guide rail because the OIS damper 190 is disposed close to the first ball member 141.

In this case, the OIS damper 190 may be disposed on opposite sides of the AF carrier 120 corresponding to the first ball member 141. That is, the OIS damper 190 may be disposed to be biased toward the center from opposite sides of the AF carrier 120 with respect to the first ball member 141. Accordingly, the OIS damper 190 may be disposed bilaterally symmetrically between the AF carrier 120 and the OIS carrier 130 in a direction perpendicular to the optical axis direction (X-axis direction). Therefore, the OIS damper 190 can uniformly mitigate the impact in a direction perpendicular to the optical axis direction (X-axis direction).

As shown in FIG. 4, the OIS damper 190 may be provided on an upper portion of the inner surface of the AF carrier 120. That is, the first groove part 126 of the AF carrier 120 may be provided on an upper portion of the inner side surface of the AF carrier 120 toward the cover 114. Thereby, since the OIS carrier 130 can be arranged using the unused space of the AF carrier 120, there is no need to secure an additional separate space for disposing the OIS damper 190. Therefore, the actuator 100 for a camera can simply and easily add the OIS damper 190 without expanding the overall size or changing the specifications of other parts.

As shown in FIG. 5, the second AF damper 182 may be disposed between the outer side surface of the AF carrier 120 and the inner side surface of the base 112. In addition, the third AF damper 183 may be disposed between the outer side surface of the AF carrier 120 and the inner side surface of the base 112. Accordingly, the second AF damper 182 and the third AF damper 183 can mitigate an impact in a direction perpendicular to the optical axis direction (X-axis direction or Y-axis direction) between the base 112 and the AF carrier 120.

Figure 6:
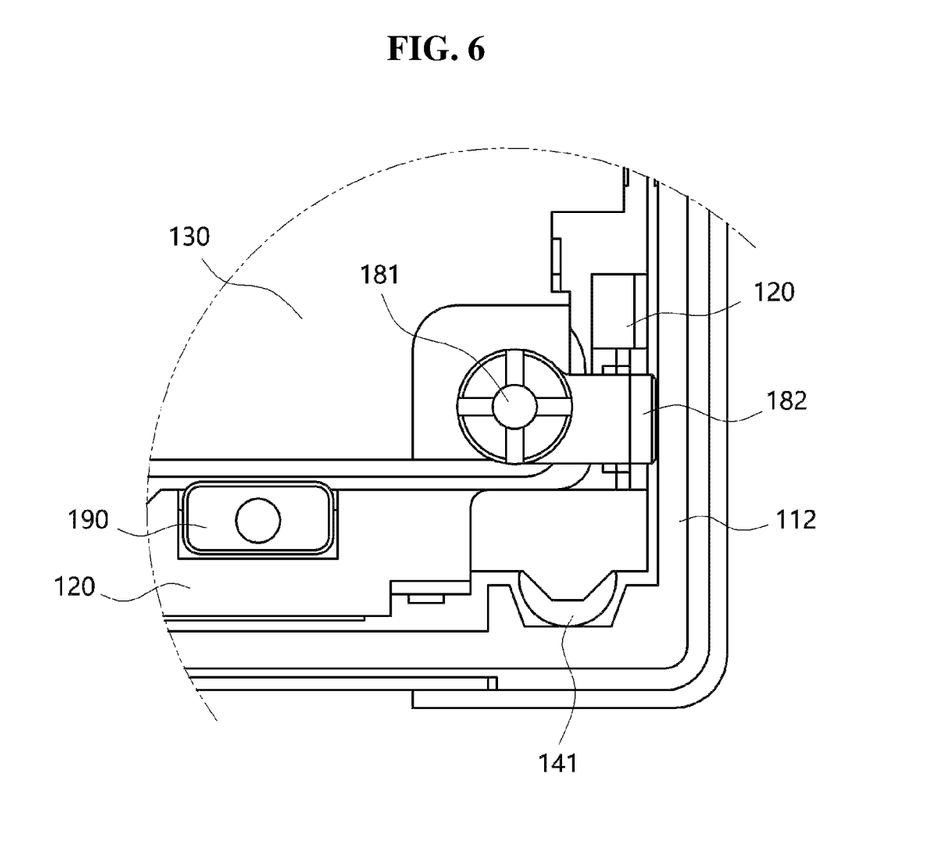
FIG. 6 is an enlarged view of a state in which a stopper is removed from a portion C of FIG. 3.

As shown in FIG. 6, the OIS damper 190 may be inserted to protrude from the first groove part 126 of the AF carrier 120 toward the OIS carrier 130. That is, the OIS damper 190 may form a space between the AF carrier 120 and the OIS carrier 130 so that the AF carrier 120 and the OIS carrier 130 do not directly contact each other. Accordingly, the OIS damper 190 can suppress the collision between the AF carrier 120 and the OIS carrier 130.

Figure 7:
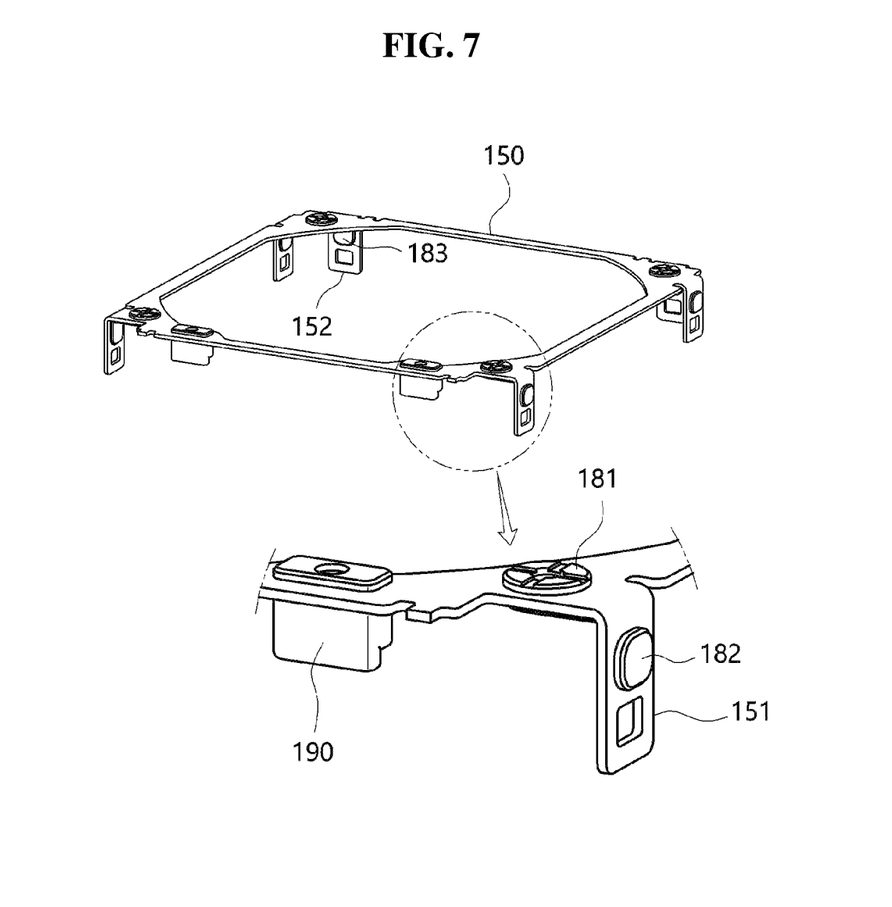
FIG. 7 is a perspective view illustrating an example in which an OIS damper is coupled to a stopper in a camera actuator according to an exemplary embodiment of the present invention.
Figure 8:
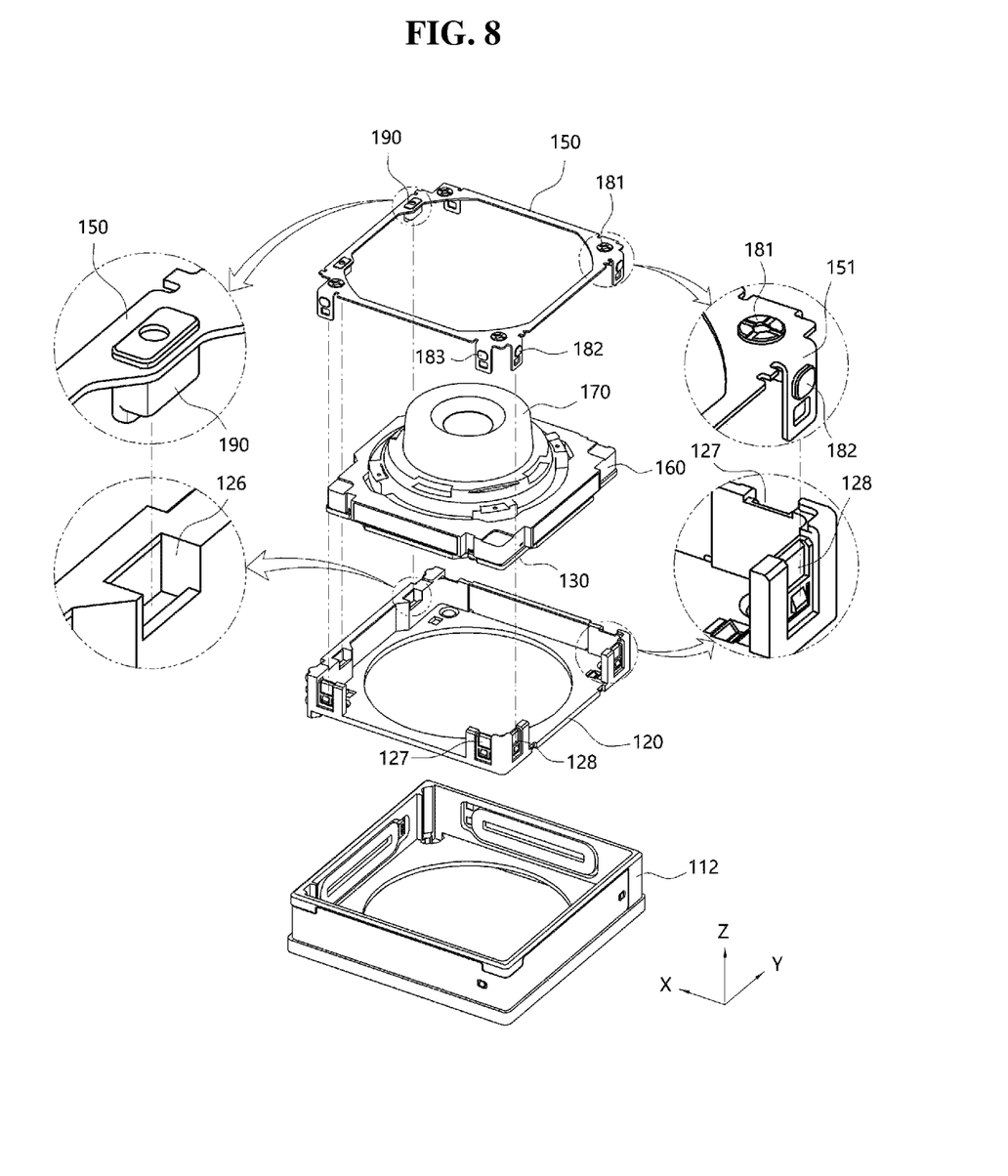
FIG. 8 is an exploded perspective view of a camera actuator to which the stopper of FIG. 7 is applied.

FIG. 7 is a perspective view illustrating an example in which an OIS damper is coupled to a stopper in a camera actuator according to an exemplary embodiment of the present invention, and FIG. 8 is an exploded perspective view of a camera actuator to which the stopper of FIG. 7 is applied.

Referring to FIGS. 7 and 8, the OIS damper 190 may be integrally provided with the stopper 150. For example, the OIS damper 190 may be formed to extend downward from the bottom surface of the stopper 150 in the optical axis direction (Z-axis direction).

In this case, the stopper 150 may be coupled to the AF carrier 120 such that the OIS damper 190 is disposed between the AF carrier 120 and the OIS carrier 130. That is, the stopper 150 may be coupled to the AF carrier 120 such that the OIS damper 190 is inserted into the first groove part 126 provided on the inner side surface of the AF carrier 120.

Accordingly, the OIS damper 190 may be stably disposed between the AF carrier 120 and the OIS carrier 130. In addition, since the actuator 100 for a camera may omit a separate coupling process for the OIS damper 190 in the manufacturing process, the manufacturing process may be simplified.

Although exemplary embodiments of the present invention have been described above, the spirit of the present invention is not limited to the embodiments set forth herein. Those of ordinary skill in the art who understand the spirit of the present invention may easily propose other embodiments through supplement, change, removal, addition, etc. of elements within the same spirit, but the embodiments will be also within the scope of the present invention.

DESCRIPTION OF SYMBOLS

100: camera actuator 110: housing
112: base 114: cover
120: AF carrier 121: AF driving unit
122: AF coil 123: AF magnet
124: first guide rail 125: second guide rail
126: first groove part 127: second groove part
128: third groove part 130: OIS carrier
131: OIS driving unit 132: OIS coil
133: OIS magnet 140: ball member
141: first ball member 142: second ball member
143: third ball member 150: stopper
151: first extension part 152: second extension part
160: middle guide 161: third guide rail
170: lens barrel 180: AF damper
181: first AF damper 182: second AF damper
183: third AF damper 190: OIS damper

What is claimed is:

1. A camera actuator, comprising:
a housing comprising a base and a cover;
an auto focus (AF) carrier mounted in the housing and moving in an optical axis direction;
an optical image stabilization (OIS) carrier on which a lens barrel is mounted, and mounted in the AF carrier to move in a direction perpendicular to the optical axis direction;
a first ball member disposed between an inner side surface of the housing and an outer side surface of the AF carrier to assist movement of the AF carrier;
a second ball member disposed between the AF carrier and the OIS carrier to assist movement of the OIS carrier;
an OIS damper disposed between a first surface and a second surface to mitigate an impact occurring between the AF carrier and the OIS carrier, the first surface being an inner side surface of the AF carrier and the second surface being an outer side surface of the OIS carrier, the second surface being adjacent to and facing the first surface; and
a first AF damper disposed between the AF carrier and the cover of the housing and a second AF damper disposed between the AF carrier and the base of the housing, the first AF damper and the second AF damper disposed to mitigate an impact occurring between the AF carrier and the housing,
wherein the AF carrier has a groove part on the first surface, the groove part accommodating the OIS damper, and wherein the OIS damper protrudes from the first surface toward the second surface to maintain a minimum distance between the first surface and the second surface.

2. The camera actuator of claim 1, wherein the OIS damper is disposed on a side surface of the first ball member of the first surface.

3. The camera actuator of claim 1, wherein the OIS damper is disposed on an upper portion of first surface.

4. The camera actuator of claim 1, wherein the OIS damper is disposed on opposite sides of the AF carrier corresponding to the first ball member.

5. The camera actuator of claim 1,
further comprising a stopper disposed above the OIS carrier to restrict a movement of the OIS carrier and the AF carrier in the optical axis direction,
wherein the OIS damper is provided integrally with a bottom surface of the stopper.

* * * * *